United States Patent [19]

Scherenberg

[11] 4,114,736
[45] Sep. 19, 1978

[54] CORD RETRACTOR FOR RETRACTING CORD OF ELECTRICAL APPLIANCES

[76] Inventor: Volker Scherenberg, 11 Meadow La., Saddle River, N.J. 07458

[21] Appl. No.: 812,507

[22] Filed: Jul. 5, 1977

[51] Int. Cl.$^2$ ............................................ H02G 11/02
[52] U.S. Cl. ................................ 191/12.4; 242/107.3; 242/107.6
[58] Field of Search ........... 137/355.19, 355.2, 355.21, 137/355.23; 242/84.5 R, 107 R, 107.3, 107.4 R, 107.6; 191/12.2 R, 12.4; 188/82.3, 82.4, 82.7

[56] References Cited

U.S. PATENT DOCUMENTS

| | | | |
|---|---|---|---|
| 2,521,178 | 9/1950 | Meletti | 191/12.2 R |
| 2,585,070 | 2/1952 | Allard | 191/12.4 |
| 2,590,890 | 4/1952 | Redo | 191/12.4 |
| 2,926,865 | 3/1960 | Humphreys | 191/12.2 R |
| 2,979,576 | 4/1961 | Huber | 191/12.4 |
| 3,147,833 | 9/1964 | McWilliams et al. | 191/12.4 |
| 3,808,382 | 4/1974 | Blanch et al. | 191/12.2 R |

FOREIGN PATENT DOCUMENTS 2,101,822  7/1971  Fed. Rep. of Germany .......... 188/82.7

Primary Examiner—Stephen G. Kunin
Attorney, Agent, or Firm—Kane, Dalsimer, Kane, Sullivan and Kurucz

[57] ABSTRACT

A cord retractor for retracting a cord of an electrical appliance, includes a housing adapted to be mounted to a supporting surface. A drum is rotatably mounted in the housing. Electrical connections are provided for interconnecting the drum and housing and for connecting the housing to a source of electricity. The housing is provided with access to the drum for introduction of a cord of an electrical appliance into the housing to be reeled onto the drum and connected to the electrical connections so that electricity is supplied to the appliance. A spring is on the housing and is connected to the drum and tends to rotate the drum in the direction causing the cord to be reeled onto the drum and retracted into the housing. Releasable retention structure is provided to automatically retain the drum in position after a desired amount of cord has been reeled from the drum out of the housing as the appliance is being used and, when released, permits the spring to rotate the drum in the direction to reel the cord back onto the drum.

15 Claims, 9 Drawing Figures

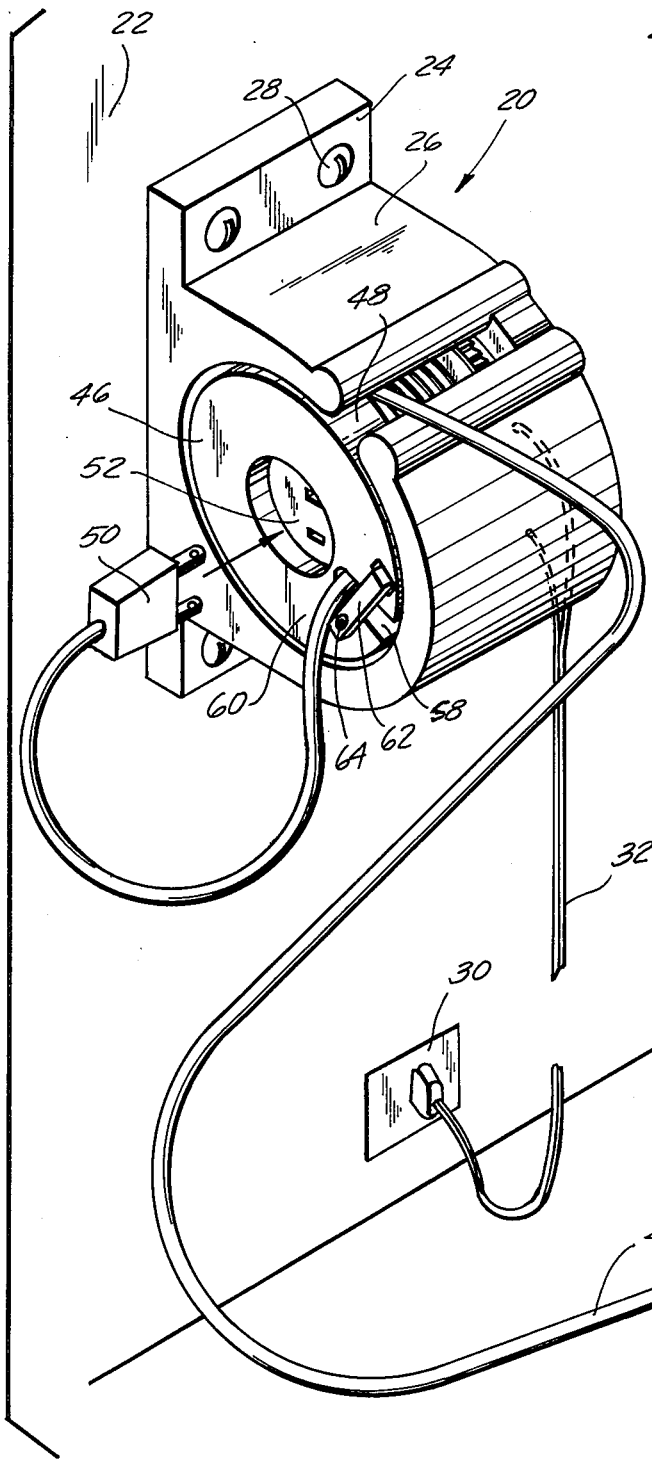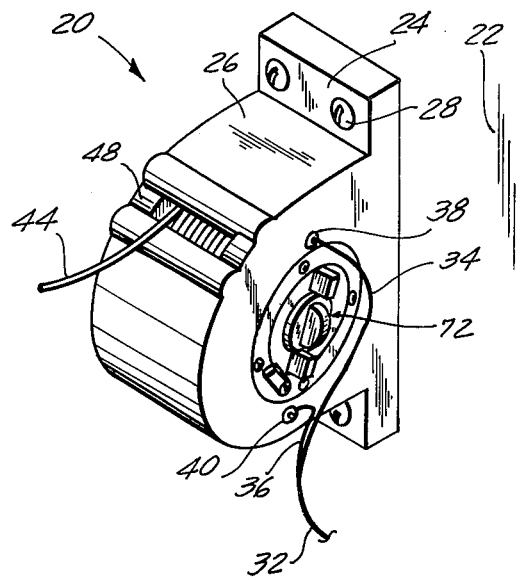

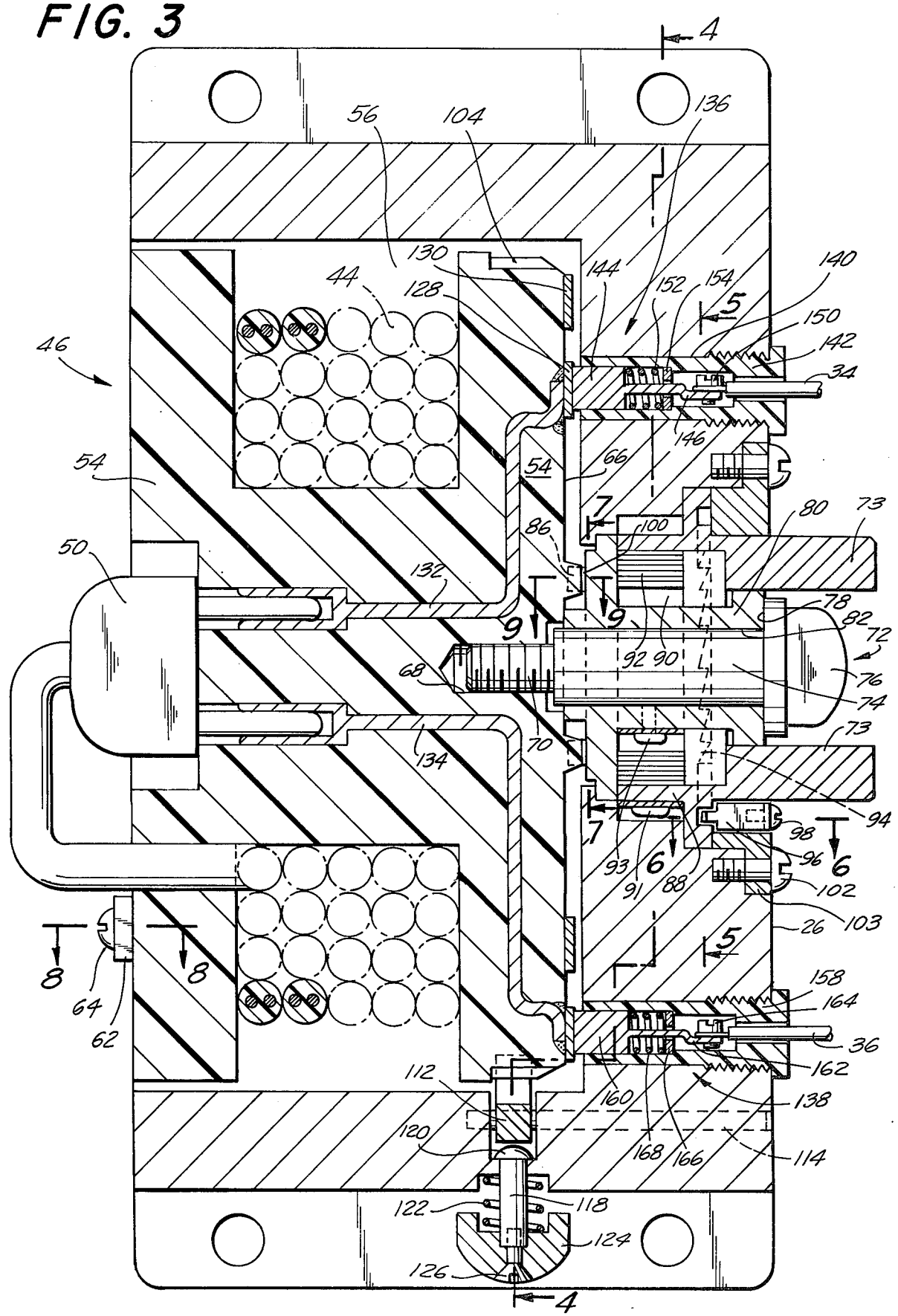

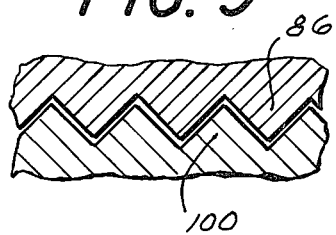
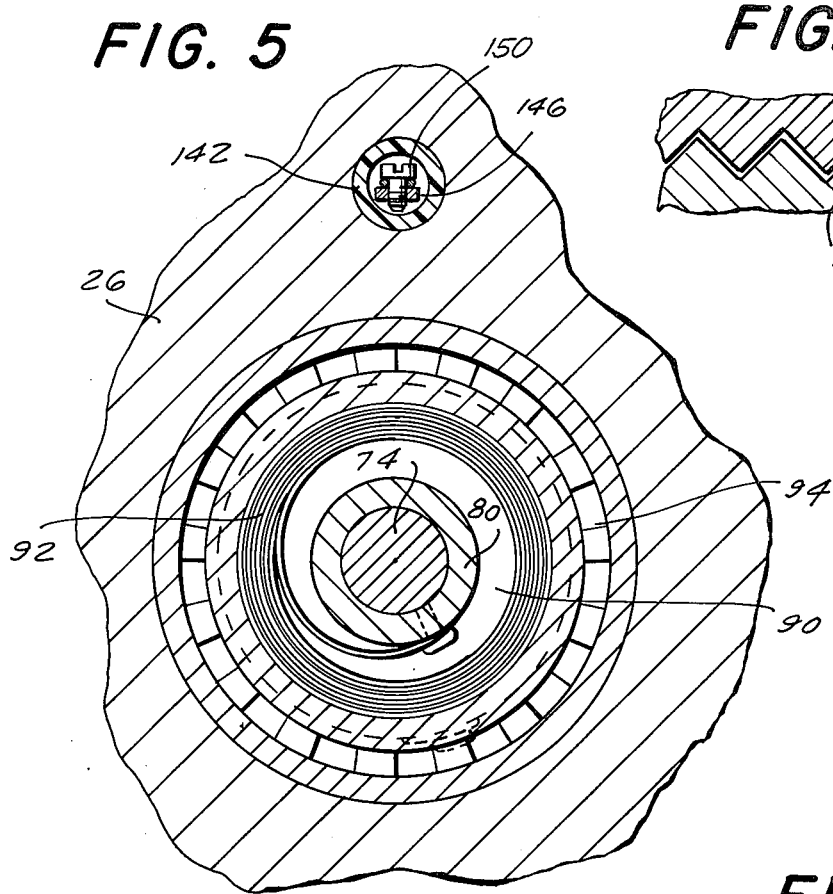
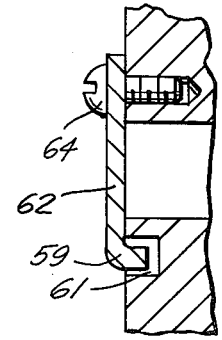
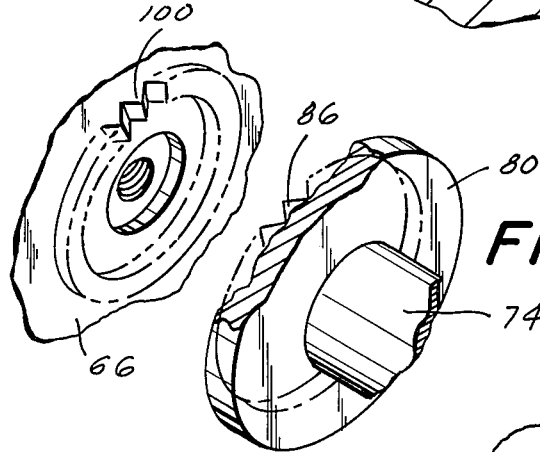
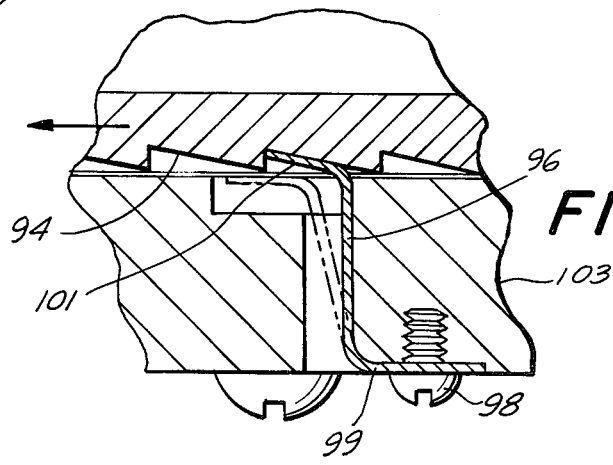

CORD RETRACTOR FOR RETRACTING CORD OF ELECTRICAL APPLIANCES

BACKGROUND OF THE INVENTION

Many types of electrical and mechanical devices for cord retraction have been developed over the years. In addition to categorizing these devices as being either mechanical or electrical, they can be categorized in the following manner. One kind is independent of the appliance and has the cord permanently mounted on the device with the cord being attachable to the appliance. The other kind of device includes the retractable means as part of the electrical appliance.

SUMMARY OF THE INVENTION

It is among the primary objectives of the present invention to provide an inexpensive, dependable, cord retractor adapted to be mounted to a wall or other surface and to be connected to a source of electricity. The cord retractor is designed to receive a variety of different types of electrical cords from a number of different types of appliances and to provide means for connection of the cord retractor to the cord from the electrical appliance, and in turn, connect the appliance to the source of electricity.

It is an objective to provide a cord retractor with a spring biased, rotatable drum thereon tending to rotate in a direction which retracts the cord onto the drum and into the housing of the bracket. Furthermore, the structure is designed so that the cord can be reeled from the bracket with the drum rotating against the bias of the spring and, when released, the amount of unreeled cord will remain outside of the cord retractor with retention means holding the drum in position. Releasable structure is provided on the retention means so that, upon actuation of the releasable structure, the drum will be released and the spring will rotate the drum in the reverse direction thereby automatically reeling the cord back onto the drum into the retracted position. Also, it is an objective to provide a spring control means for the spring tending to rotate the drum in the retraction direction whereby the spring can be cocked or preloaded. This can be accomplished with the assistance of a manual control on the exterior of the cord retractor.

The parts on the cord retractor which move relative to one another are interconnected by means of appropriate ratchet and pawl arrangements. Furthermore, the electrical contacts are continuous through the device so that electrical contact is maintained between the rotating drum and the stationary portions of the cord retractor which are directly connected to the source of electricity. Thus, electrical connection is maintained between the cord reeled on the drum and electrically connected thereto and the source of electricity thereby providing for electrical connection from the source of electricity to the appliance through the intermediate cord retractor.

In summary, a cord retractor is provided for retracting a cord of an electrical appliance. The cord retractor includes a housing adapted to be mounted to a supporting surface. A drum is rotatably mounted in the housing. Electrical connection means is provided for connecting the cord retractor to a source of electricity. Access means is on the housing and drum for introducing a cord of an electrical appliance into the housing to be reeled onto the drum and connected to the electrical connection means to supply electricity to the appliance. Spring means is on the housing and connected to the drum and tending to rotate the drum in the direction causing the cord to be reeled onto the drum and retracted into the housing. Releasable retention means is provided to automatically retain the drum in position after a desired amount of cord has been reeled from the drum out of the housing as the appliance is being used and, when released, permitting the spring to rotate the drum in the direction to reel the cord back onto the drum.

With the above objectives among others in mind, reference is made to the attached drawing.

BRIEF DESCRIPTION OF THE DRAWINGS

FIG. 1 is a perspective view of an exemplary embodiment of a cord retractor of the invention mounted on a wall surface and showing a portion of the cord for an electric shaver being mounted thereon and electrically connected thereto;

FIG. 2 is a perspective view thereof from the opposite side;

FIG. 3 is a sectional elevation view thereof taken along the plane of line 3—3 of FIG. 4;

FIG. 5 is a fragmentary sectional elevation view thereof taken along the plane of line 5—5 of FIG. 3;

FIG. 6 is a fragmentary sectional view thereof taken along the plane of line 6—6 of FIG. 3;

FIG. 7 is a fragmentary sectional view thereof taken along the plane of line 7—7 of FIG. 3;

FIG. 8 is a fragmentary sectional view thereof taken along the plane of line 8—8 of FIG. 3; and FIG. 9 is a fragmentary sectional view thereof taken along the plane of line 9—9 of FIG. 3.

DETAILED DESCRIPTION

Figure 4:
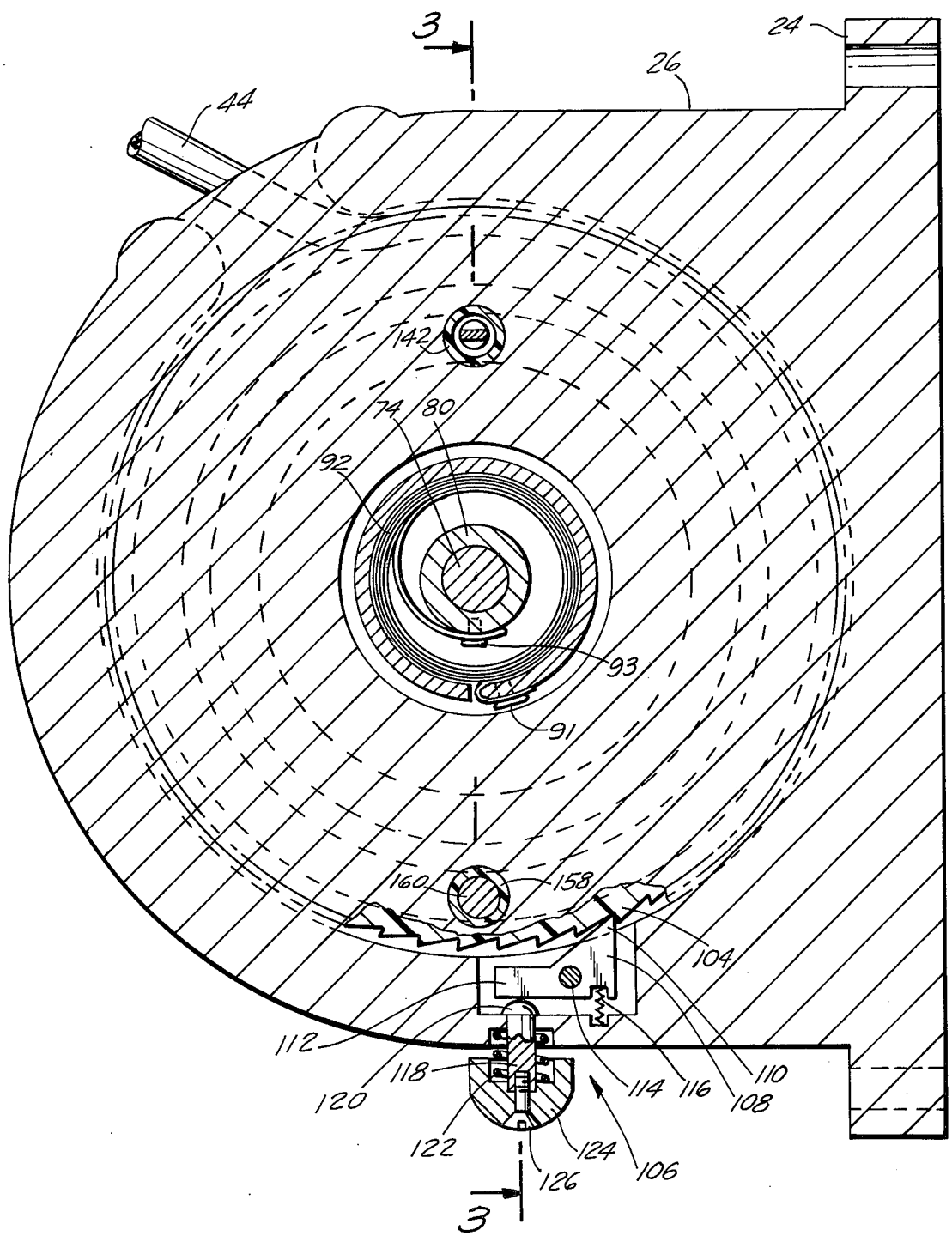
FIG. 4 is a sectional elevation view thereof taken along the plane of line 4—4 of FIG. 3.

The cord retractor 20 is depicted in position mounted on a wall 22 in FIGS. 1 and 2 of the drawings. Mounting is achieved in conventional fashion such as by mounting base 24 of housing 26 to wall 22 by a series of screws 28. A cord retractor can then be connected to a wall outlet 30 by means of a conventional electrical cord 32 or directly plugged into a source of electricity. Electrical cord 32 is of a conventional type including two leads 34 and 36 with lead 34 connected to the cord retractor at electrical connection 38 and lead 36 connected at electrical connection 40. Naturally, the cord retractor could also be designed for connection to an alternate power source as a battery.

As shown, the cord retractor is connected to a conventional electrical shaver 42 having an electrical cord 44 attached to the shaver at one end. A portion of the cord 44 is reeled onto rotating drum 46 of cord retractor 20. The cord can be directed into and out of housing 26 of the cord retractor through access opening 48. The free end of the cord 44 with electrical plug 50 thereon is coupled with electrical socket 52 in rotating drum 46. An electrical connection is provided through the housing so that the source of electricity from wall socket 30 is transmitted through cord 32, and through cord 44 to shaver 42 so that the shaver may be operated in a conventional manner. When mounted as shown, the cord 44 can be retracted within cord retractor 20 or removed therefrom by reeling or unreeling cord 44 onto and off of rotating drum 46 as desired.

The interior components of cord retractor 20 are depicted in FIGS. 3-9. Drum 46 includes a substantially cylindrical body portion 54 with an annular recess 56 about its outer peripheral surface. The recess 56 forms the receptacle for cord 44 as it is wound and unwound from drum 46. A slot 58 communicates between recess 56 and the exposed side wall 60 of the drum. A portion of the cord between plug 50 and a portion reeled on drum 46 passes through the slot 58 so that plug 50 can be inserted in receptacle 52 on the drum. The cord is then fixed in position in slot 58 by means of a bar 62 removably connected in conventional means such as by screw 64 at one end and by capturing flange 59 at the other end in recess 61 on the drum.

The inner face 66 of drum 54 includes a central threaded aperture 68 to receive the threaded end 70 of a locking bolt 72. The body portion 74 of the bolt 72 together with rotatable member 80 forms a rotatable shaft on which drum 46 is mounted. The opposite end of bolt 72 has an enlarged head 76 which has its undersurface 78 in engagement with a first hollow rotatable member 80. Body portion 74 of bolt 72 is journaled in a passageway 82 through the first rotatable member 80. The end of the first rotatable member 80 facing inner face 66 of the drum includes a plurality of saw teeth 86 which interengage with mating saw teeth 100 on the drum face. Thus, the drum and first rotatable member will rotate together as will bolt 72.

A second hollow rotatable member 88 is journaled about the first rotatable member and forms therewith a recess 90 therebetween. A spring 92 is mounted in the recess and is connected on one end to the first rotatable member by set screw 93 and on the other end to the second rotatable member by set screw 91 so that rotation of one member with respect to the other will bias or cock the spring. The spring is maintained in a cocked position by means of a ratchet and pawl arrangement with a series of ratchet teeth 94 being on the second rotatable member and a leaf spring type pawl mechanism 96 mounted by means of a screw 98 to the collar 103, which is mounted to housing 26 in a conventional manner such as by a plurality of conventional threaded screws 102.

Bolt 72 threadedly engaged with drum 46 holds the first rotatable member and the drum to one another. Set screw 93 can also be extended into engagement with bolt body 74 to assist in maintaining the bolt and first rotatable member in fixed position with respect to one another. The second rotatable member is captured between a flange on the first rotatable member and a hollow collar 103 with a central aperture for passage of ears 73 on the second rotatable member and bolt head 76 therethrough.

A portion of the outer peripheral surface of the drum 46 adjacent to the inner wall 66 is provided with an annular row of ratchet teeth 104 which are positioned to mate with a pawl assembly 106 as depicted in FIGS. 3 and 4. The pawl assembly includes a pivoted pawl bar 108 having a finger 110 on one end and an arm 112 extending from the other end. The bar 108 is mounted by means of a centrally located pivot pin 114. A captured helical spring 116 biases finger 110 into engagement with the ratchet teeth. In engagement with bar 112 is a manual pawl latch arrangement including a piston 118 with a free end 120 in engagement with bar 112. Surrounding the piston is a helical spring 122 which is captured in position around the piston by means of a button 124 and engagement with the housing 26. The piston extends through an aperture in the housing into engagement with the bar 112 and the button 124 is in position for manual engagement. Button 124 is assembled to piston 118 by means of a threaded screw 126. When the operator depresses button 124 piston end 120 will depress bar 112 and pivot the pawl finger 110 away from the ratchet teeth freeing drum 46 for rotation in the reeling direction. At the same time, springs 122 and 116 will be biased so that release of button 126 will cause the spring 116 to return finger 110 into engagement with the ratchet teeth and spring 112 to return the piston 118 to the initial position releasing bar 112 to be pivoted to the initial position.

The electrical connections through bracket 20 achieves the interconnection between the plug 50 going to appliance 42 and the plug at the end of cord 32 going to wall socket 30 and takes the form of the following arrangement. Inner face 66 of drum 46 includes a pair of concentric rings in the form of an inner ring 128 and an outer ring 130. The rings are of electrically conductive material and are mounted on face 66 in any conventional fashion such as by screws or adhesive. One lead 132 of electrically conductive material extends from socket 52 through the body of drum 46 into electrical contact with inner ring 128. The interconnection therebetween can be formed by any conventional means such as welding. The other lead 134 from socket 52 passes through drum body 46 into electrical contact with outer ring 130. Once again the electrical connection at that point can be made in a conventional manner such as by welding. As shown, it is convenient to make the main body portion of drum 46 of non-conductive material such as plastic. In this manner, the electrical connections are insulated and a major part of the cord retractor is formed of inexpensive material. The free ends of leads 132 and 134 form the socket entries for the prongs of plug 50 thereby making the electrical connection between cord 44 of shaver 42 and the inner face 66 of drum 46.

The electrical connection between the drum and the fixed housing 26 of bracket 20 is accomplished by the mating between contact assembly 136 in housing 26 and ring 128 and contact assembly 138 in housing 26 and contact ring 130. Contact assembly 136 is mounted in a passageway 140 through housing 26 to form electrical connection 38. The assembly includes an outer hollow tube 142 of non-conductive material mounted in threaded interengagement with passageway 140. A piston 144 of electrically conductive material is slidably positioned in tube 142, which is an insulator, and has a piston arm 146 extending from one end. The piston arm is electrically connected to one electrical lead 34 of cord 32 by means of a screw 150. Captured between inner surfaces on tube 142 and the rear end of the head of piston 144 is a compression spring 152 which tends to bias piston 144 into engagement with adjacent electrical contact ring 128 on drum 46. Thus, an electrical contact is maintained between the rotatable drum and the housing of bracket 20 at all times. A stop washer 154 mounted against a shoulder on the inner surface of tube 142 forms the engaging surface for one end of compression spring 152 and the rear surface of the head of piston 144 forms the other engaging surface. Screw 150 passes through aligned apertures in lead 34 and piston arm 146.

Contact assembly 138 is identical in structure as contact assembly 136 and forms an electrical connection for outer ring 130. It is connected to the other lead 36 of wire 32 going to outlet 30 to form electrical connection 40. Assembly 138 includes an outer tube 158, of non-conductive material such as plastic for insulation, which is hollow and has a piston 160 reciprocally mounted therein. The piston is of electrically conductive material and has a piston arm 162 interconnected with lead 36 by means of screw 164 passing through aligned apertures in the electrical lead 36 and the piston arm 162. A washer 166 captures a compression spring 168 between its surface and the rear surface of the head of piston 160 to bias the piston 160 into engagement with outer ring 130 thus providing a continuous electrical connection between the rotatable drum 46 and lead 36.

With the electrical connections through housing 26 being insulated by tubes 142 and 158, the remainder of the housing can be formed of any common type of inexpensive, rigid, supporting material of metal or plastic.

OPERATION AND USE

In operation, cord retractor 20 is mounted on a convenient supporting surface by applying screws 28 through apertures in base 24 and affixing the cord retractor to the wall. Drum 46 has to be removed after unscrewing locking bolt 72. Plug 50 at end of cord 44 is then positioned in socket 52. The portion of cord 44 adjacent to plug 50 is then fitted in slot 58 and held in the slot by means of cord retractor 62 which has one flanged end 59 in notch 61 and the other end held in place by screw 64 threaded into a receiving recess in the drum. A portion of cord 44 of shaver 42 is then reeled onto drum 46 in recess 56 and then passed through access opening 48. Then drum 46 is placed back into housing 26 and locked with bolt 72 thus completing the electrical circuit through the cord retractor. The plug at the end of cord 32 is then plugged into wall socket 30 thus completing the electrical circuit between wall socket 30 and shaver 42 with the assistance of the electrical connection through cord retractor 20. More specifically, internal lead 132 connects with contact ring 128 which is in electrical contact with contact assembly 136 which in turn is connected to lead 34 of cord 32. Similarly, the other internal lead 134 is connected to contact ring 130 which in turn connects with contact assembly 138 which is electrically connected to the other lead 36 of cord 32.

To put the retraction feature of cord retractor 20 in operation, the exposed pair of ears 73 of the second rotatable member 88 are grasped and rotated thus biasing spring 92 which is connected at one end to the outer surface of the second rotatable member by means of screw 91 and connected at the other end to the outer surface of the first rotatable member 80 by means of screw 93. The first rotatable member 80 is prevented from rotating in the same direction due to pawl assembly 106 which keeps the drum from rotating in that direction and accordingly member 80 through interengaging saw teeth 106 and 86. Therefore, relative rotation of members 80 and 88 is achieved and that action will cock spring 92 which is then in condition to provide the retraction force. The spring is maintained in cocked position by means of pawl 96 which is in the form of a leaf spring and is mounted at one end 99 in fixed position on the housing 26 by means of screw 98 and has its other free end 101 engaging ratchet teeth 94 on the second rotatable member 88. The engagement is such that rotation in one direction is permitted and rotation in the other direction is prohibited. As stated above, spring 92 is prevented from rotating member 80 because member 80 is held in fixed position through overlapping saw teeth 100 and 86 on inner face 66 of drum 46 and the adjacent surface of member 80 respectively and the locking interengagement between ratchet teeth 104 on the periphery of drum 46 and pawl assembly 106 on housing 26. The shaver can now be used in the desired manner.

As cord 44 is reeled from drum 46 through opening 48 the drum will rotate accordingly and when pulling is stopped pawl finger 110 will engage with an appropriate ratchet tooth 104 to hold the assembly in that position. Thereafter, when retraction is desired, button 124 is pushed compressing spring 122 and causing the tip 120 of the piston 122 to pivot pawl 108 freeing pawl finger 110 from the ratchet teeth 104. The force applied by cocked spring 92 can then rotate the first rotatable member 80 along with drum 46 through interengaged cams 86 and 100. This causes the drum to rotate in the retraction direction and reels cord 44 onto drum 46 in recess 56. When the desired amount of retraction has been achieved, button 124 is released whereupon spring 122 directs plunger 118 away from pawl bar 112 so that spring 116 will again force pawl finger 110 into engagement with a ratchet tooth 104 and hold the drum in fixed position. If necessary, spring 92 can then be re-cocked by again rotating the ears 73 on the second rotatable member 88.

While the depicted embodiment of cord retractor 20 is shown in use with an electrical shaver 42, it can also be used in connection with other types of electrical household, bathroom, workshop or industrial appliances like coffeemakers, toasters, electrical knives, hairdryers, irons, electrical drills, saws and the like. The common denominator is the provision of an electrical cord on the appliance. The drum can be designed to hold various lengths of cord and a variety of different types of dimensions. The drum includes a conventional electrical socket to facilitate ease of connection between the bracket and the appliance. Additionally, the device can be in a unitary form as shown or can be combined with other drums as a combination structure and can also be incorporated in open or closed shelves or tables in addition to the wall structure as shown. Of course, other releasable cord retention means, some of which are commercially available, may be incorporated into the cord retractor of this invention.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A cord retractor for retracting a cord of an electrical appliance comprising:
   a housing adapted to be mounted to a supporting structure;
   a drum rotatably mounted in the housing;
   electrical connection means for connecting the cord retractor to a source of electricity;
   access means on the housing and drum to introduce a cord of an electrical appliance into the housing to be reeled onto the drum and connected to the electrical connection means to supply electricity to the appliance;
   electrical connection means for connecting the cord retractor to the cord of an electrical appliance;
   spring means on the housing and connected to the drum and tending to rotate the drum in the direction causing the cord to be reeled onto the drum and retracted into the housing; and releasable retention means to automatically retain the drum in position after a selected amount of cord has been reeled from the drum out of the housing as the appliance is being used and, when released, permitting the spring to return the drum in the direction to reel the cord back onto the drum.

2. The invention in accordance with claim 1, wherein the drum has a cylindrical outer surface with a recess therein to receive the cord, the drum being spaced from a concentric inner surface on the housing and mounted on a rotatable shaft in the housing to rotate with respect to the surrounding concentric surface in the housing, an aperture in the housing interrupting the concentric surface surrounding the drum to permit entrance and removal of the cord from the housing and the drum.

3. The invention in accordance with claim 2 wherein the releasable retention means includes a line of ratchet teeth around the peripheral surface of the drum and a deflectable pawl on the housing in position to engage with the ratchet teeth as the drum is rotated to unreel the cord in position so that when the unreeling is stopped the pawl will engage the ratchet and retain the drum in position, a deflection spring tending to direct the pawl into engagement with the ratchet teeth on the drum, a release spring coupled with a manual pawl release switch whereupon activation of the release switch will bias the spring and deflect the pawl out of engagement with the ratchet teeth on the drum permitting the spring means to rotate the drum in the direction causing reeling of the cord onto the drum, and deactivation of the release switch will permit the release spring to direct the manual pawl away from the pawl so the deflection spring can again direct the pawl into engagement with the ratchet teeth on the drum.

4. The invention in accordance with claim 3 wherein the switch means includes a button mounted on the housing and extending out of the housing terminating in a finger engaging portion, a reciprocal plunger extending through the housing from the finger engaging portion to be reciprocally movable into and out of engagement with the pawl on the housing, the release spring surrounding the plunger and captured between the undersurface of the finger engaging portion and a surface on the housing, and the pawl being pivotally mounted between its ends on the housing and having a rear end portion adapted to be engaged by the free end of the plunger and the other end of the pawl having a finger for engagement with the ratchet teeth on the drum, the finger end of the pawl being divided by the deflection spring into engagement with the ratchet teeth, the pawl being releasable from the ratchet teeth upon depression of the finger engaging portion of the button whereupon the plunger will pivot the pawl out of engagement with the ratchet teeth.

5. The invention in accordance with claim 1 wherein the housing means are provided for mounting on supporting structure.

6. A cord retractor for retracting a cord of an electrical appliance comprising:

a housing adapted to be mounted to a supporting structure;

a drum rotatably mounted in the housing, the drum having a cylindrical outer surface with a recess therein to receive the cord, the drum being spaced from a concentric inner surface on the housing and mounted on a rotatable shaft in the housing to rotate with respect to the surrounding concentric surface in the housing, an aperture in the housing interrupting the concentric surface surrounding the drum to permit entrance and removal of the cord from the housing and the drum;

electrical connection means for connecting the cord retractor to a source or electricity, the electrical connection means including an electrical socket on the drum in position to be interconnected with a plug from the cord of an electrical appliance reeled onto the drum, electrical connections between the socket on the drum and the stationary portion of the housing electrically connected with an electrical cord extending from the stationary portion of the housing and being connectable to an outlet from a source of electricity;

access means on the housing and drum to introduce a cord of an electrical appliance into the housing to be reeled onto the drum and connected to the electrical connection means to supply electricity to the appliance;

spring means on the housing and connected to the drum and tending to rotate the drum in the direction causing the cord to be reeled onto the drum and retracted into the housing; and releasable retention means to automatically retain the drum in position after a selected amount of cord has been reeled from the drum out of the housing as the appliance is being used and, when released, permitting the spring to return the drum in the direction to reel the cord back onto the drum.

7. The invention in accordance with claim 6, wherein the connection between the electrical connection in the drum and the electrical connection through the fixed portion of the housing includes contact points on the exterior of the drum and an adjacent surface of the interior of the housing whereupon contact therebetween will provide an electrical connection from the socket and the drum to the fixed portion of the housing and the cord extending therefrom.

8. The invention in accordance with claim 7, wherein the electrical contact points on the stationary portion of the housing are spring biased into contact with the contact points on the rotatable drum.

9. A cord retractor for retracting a cord of an electrical appliance comprising:

a housing adapted to be mounted to a supporting structure;

a drum rotatably mounted in the housing, the drum having a cylindrical outer surface with a recess therein to receive the cord, the drum being spaced from a concentric inner surface on the housing and mounted on a rotatable shaft in the housing to rotate with respect to the surrounding concentric surface in the housing, an aperture in the housing interrupting the concentric surface surrounding the drum to permit entrance and removal of the cord from the housing and the drum, the rotatable shaft being interconnected with the drum is fixed to a first rotatable member to rotate therewith, the first rotatable member being provided in a second rotatable member in the housing, a spring housed between the first and second rotatable members with one end connected to the first rotatable member and the other end connected to the second rotatable member, holding means for retaining the relative position of one rotatable member with respect to the other when the spring is biased, and spring biasing means extending from the housing and connected to the second rotatable member so that rotation of the second rotatable member relative to the first rotatable member will bias the spring a predetermined amount and the holding means will retain the spring in cocked biased position when the second rotatable member is released;

electrical connection means for connecting the cord retractor to a source of electricity;

access means on the housing and drum to introduce a cord of an electrical appliance into the housing to be reeled onto the drum and connected to the electrical connection means to supply electricity to the appliance;

spring means on the housing and connected to the drum and tending to rotate the drum in the direction causing the cord to be reeled onto the drum and retracted into the housing; and releasable retention means to automatically retain the drum in position after a selected amount of cord has been reeled from the drum out of the housing as the appliance is being used and, when released, permitting the spring to return the drum in the direction to reel the cord back onto the drum.

10. The invention in accordance with claim 9 wherein a collar is connected to the housing and the holding means includes a ratchet on the second rotatable member and a pawl on the collar connected to the housing.

11. The invention in accordance with claim 9 wherein the means for rotating the second rotatable member with respect to the first rotatable member includes a pair of ears extending outwardly from the housing and inwardly into connection with the second rotatable member.

12. The invention in accordance with claim 9 wherein the first rotatable member is interengaged with the adjacent face of the rotatable drum by means of interengaging saw teeth surfaces so that rotation of the first rotatable member by the cocked spring means will cause rotation of the drum and reeling of the cord onto the drum.

13. A cord retractor for retracting a cord of an electrical appliance comprising:

a housing adapted to be mounted to a supporting structure;

a drum rotatably mounted in the housing;

electrical connection means for connecting the cord retractor to a source of electricity;

access means on the housing and drum to introduce a cord of an electrical appliance into the housing to be reeled onto the drum and connected to the electrical connection means to supply electricity to the appliance; and electrical connection means for connecting the cord retractor to the cord of an electrical appliance.

14. The invention in accordance with claim 13, wherein spring means on the housing and connected to the drum and tending to rotate the drum in the direction causing the cord to be reeled onto the drum and retracted into the housing.

15. A cord retractor for retracting a cord of an electrical appliance comprising:

a housing adapted to be mounted to a supporting structure;

a drum rotatably mounted in the housing;

electrical connection means for connecting the cord retractor to a source of electricity;

means for permitting a cord of an electrical appliance to be reeled onto the drum;

means for releasably electrically coupling the cord of the appliance to the cord retractor; and releasable retention means for automatically retaining the drum in position after the selected amount of cord has been reeled from the drum as the appliance is being used, said releasable retention means adapted to be released thereby permitting the drum to reel the cord back onto the drum.

* * * * *